(No Model.)
A. WILD.
APPARATUS FOR RENDERING LARD BY HOT AIR.
No. 524,012. Patented Aug. 7, 1894.
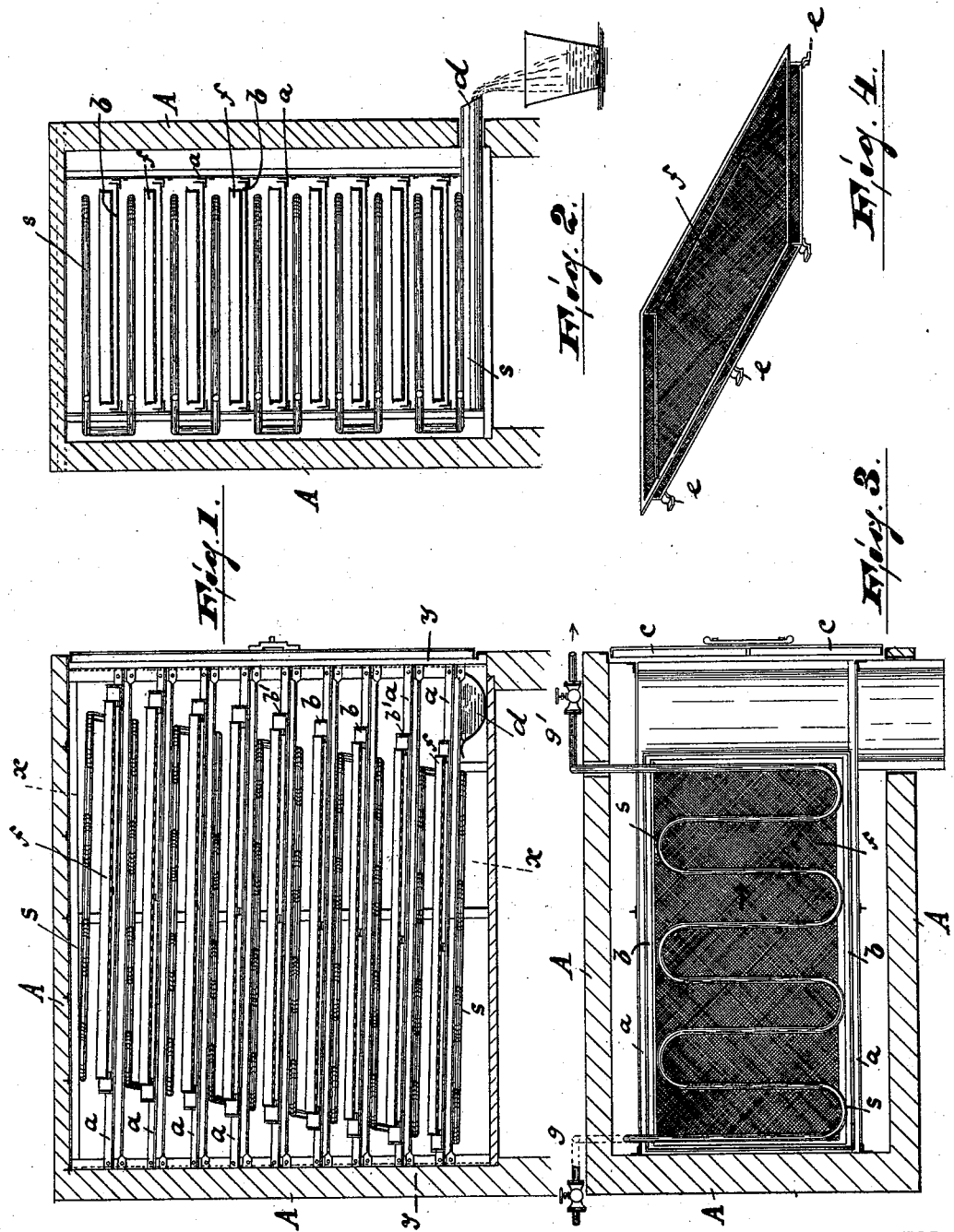

UNITED STATES PATENT OFFICE.

ADAM WILD, OF VIENNA, AUSTRIA-HUNGARY.

APPARATUS FOR RENDERING LARD BY HOT AIR.

SPECIFICATION forming part of Letters Patent No. 524,012, dated August 7, 1894.

Application filed October 12, 1893. Serial No. 487,998. (No model.)

*To all whom it may concern:*

Be it known that I, ADAM WILD, a subject of the Emperor of Austria-Hungary, residing at Vienna, Austria-Hungary, have invented a new and useful Proceeding and Apparatus for Melting Ventral Lard by Means of Heated Air, of which the following is a specification.

This invention relates to certain new and useful improvements in apparatus for trying or rendering lard from fat and it consists in the combination and arrangement of parts hereinafter more fully described and claimed.

In the drawings Figure 1 is a longitudinal section of an apparatus embodying my improvements. Fig. 2 is a cross section taken on the line $x$—$x$ of Fig. 1. Fig. 3 is a transverse section taken on the line $y$—$y$ of Fig. 1 and Fig. 4 is a perspective view of one of the trays in which the fat is placed during the process of rendering.

In said drawings A represents an oven made preferably of brick, the inside of which contains a series of inclined plates or floors $b$ supported on the sides of the oven by suitable brackets $a$ made preferably of angle iron. The interior of the oven is reached through a door $c$. The forward ends of the plates or inclined floors $b$ are so arranged that they slope gradually from the topmost plate to the bottom away from the front of the oven (see Fig. 1) and thus the superimposed plates overlap those lower to the same. The plates $b$ also incline downward toward the front of the oven, and the forward ends are provided with slit or slits $b'$ leading to an outlet channel $d$ formed in the bottom of the oven. Upon each of the plates or inclined floors $b$ is placed a screen tray or basket $f$ the bottom of which is supported above the floor $b$ by the legs $e$. The sides, ends and bottom of these trays $f$ are perforated (see Fig. 4). Above and below each inclined floor is placed a steam coil or other suitable source of heat S. These coils S are connected by the inlet pipe $g$ and outlet pipe $g'$ with respectively the source of heat and the exhaust.

In rendering lard it is essential that the fat shall not be charred by contact with the source of heat and that the rendered fat shall be free from acid, glutinous, albuminous and other deleterious substances. To accomplish this my apparatus is particularly adapted and by means of the process hereinafter described the lard rendered from the fat is pure, sweet, wholesome and non-acid.

I place in the screen trays the green and moist hog fat to be rendered; the steam or other heat is turned on gradually until all the moisture is evaporated from the fat and then sufficient heat is applied to liquefy the fat. The rendered fat then passes through the sides and bottom of the screens thus being strained of the gross impurities and flows down the inclined floors through the slits into the outlet channel $d$, from whence it escapes into a vat or similar vessel.

The distribution of the heating coils throughout the oven serves to maintain a uniform heat therein and facilitates the evaporation of the moisture from the fat. The floors $b$ prevent the rendered fat from coming in contact with the steam or heating coils. The acid and watery impurities are vaporized and driven off at the top of the oven.

Having thus described my invention, what I claim as new, and desire to secure by Letters Patent, is—

In a fat rendering oven, the combination of the walls, brackets secured thereto, a series of inclined floors supported on said brackets, removable trays supported above said floors and consisting of screen sides and floor plates designed to receive the fat, and with a continuous system of heating coils or pipes arranged between the top of each tray and the superimposed floor, said floors being arranged in layers which at their forward ends slope gradually from the topmost floor to the bottom, away from the adjacent wall of the oven, and with a drip pan arranged at the bottom of the oven and outlets from each floor leading to said drip pan, substantially as described.

In testimony whereof I have signed this specification in the presence of two subscribing witnesses.

ADAM WILD.

Witnesses:
ALFRED HAMBURGER,
H. BELMONT.